United States Patent
Svensson

(10) Patent No.: US 9,517,756 B2
(45) Date of Patent: Dec. 13, 2016

(54) METHOD AND SYSTEM FOR OPERATING A MOTOR VEHICLE BRAKE SYSTEM

(71) Applicant: Ford Global Technologies, Dearborn, MI (US)

(72) Inventor: Thomas Svensson, Leichlingen (DE)

(73) Assignee: Ford Global Technologies, Dearborn, MI (US)

( * ) Notice: Subject to any disclaimer, the term of this patent is extended or adjusted under 35 U.S.C. 154(b) by 36 days.

(21) Appl. No.: 14/594,031

(22) Filed: Jan. 9, 2015

(65) Prior Publication Data

US 2015/0197226 A1    Jul. 16, 2015

(30) Foreign Application Priority Data

Jan. 13, 2014    (DE) .................. 10 2014 200 435

(51) Int. Cl.
| | |
|---|---|
| *B60T 8/26* | (2006.01) |
| *B60T 8/28* | (2006.01) |
| *B60T 8/30* | (2006.01) |
| *B60T 8/171* | (2006.01) |

(52) U.S. Cl.
CPC .................. B60T 8/26 (2013.01); B60T 8/266 (2013.01); B60T 8/268 (2013.01); B60T 8/28 (2013.01); *B60T 8/171* (2013.01); *B60T 8/30* (2013.01); *B60T 2220/04* (2013.01)

(58) Field of Classification Search
CPC ............ B60T 8/26; B60T 8/266; B60T 8/268; B60T 8/28; B60T 8/30; B60T 8/303; B60T 8/306
See application file for complete search history.

(56) References Cited

U.S. PATENT DOCUMENTS

| | | | | |
|---|---|---|---|---|
| 3,871,713 | A * | 3/1975 | Lister ...................... | B60T 8/26 303/113.5 |
| 5,125,721 | A * | 6/1992 | Schmidt .................. | B60T 8/266 303/113.5 |
| 5,302,007 | A * | 4/1994 | Morita .................... | B60T 8/266 303/113.5 |
| 6,595,600 | B2 * | 7/2003 | Banno ..................... | B60T 8/266 303/113.5 |
| 2006/0170283 | A1 * | 8/2006 | Alvarez .................. | B60T 8/267 303/155 |
| 2006/0287797 | A1 * | 12/2006 | Haller ..................... | B60T 8/266 701/70 |

* cited by examiner

*Primary Examiner* — Dale W Hilgendorf
(74) *Attorney, Agent, or Firm* — Angela M. Brunetti; Raymond Coppiellie

(57) ABSTRACT

A brake system for a motor vehicle having front and rear axles, the brake system having front and rear axle braking mechanisms operated under pressure control devices for producing a respective brake pressure on the front and rear axles of the motor vehicle. A controller receives signal information from sensors and systems on the motor vehicle to detect initiation of a braking process and detect a current speed of travel of the motor vehicle. An initial brake pressure for the rear axle braking mechanism is determined by the controller. A target brake pressure for the rear axle braking mechanism is determined by the controller and is representative of an increase in pressure relative to the initial brake pressure and the current speed of travel. Instructions from the controller operate the pressure control devices to produce the target brake pressure at the rear axle braking mechanism.

23 Claims, 2 Drawing Sheets

METHOD AND SYSTEM FOR OPERATING A MOTOR VEHICLE BRAKE SYSTEM

CROSS-REFERENCE TO RELATED APPLICATIONS

This application claims priority to DE Application No. 10 2014 200435.7, filed Jan. 13, 2014, the disclosure of which is incorporated in its entirety by reference herein.

TECHNICAL FIELD

The embodiments disclosed herein relate to a vehicle brake system and more particularly to a method of operating the vehicle brake system.

BACKGROUND

Generally, brake systems of motor vehicles are hydraulic brake systems that act on all wheels of the motor vehicle involved in a braking event. In particular, a master cylinder is operated with a brake pedal and pressure is generated in a pressure chamber filled with brake fluid. The brake fluid is passed by way of hydraulic lines to wheel brake cylinders associated with each wheel of the vehicle. Under pressure of the brake fluid, brake linings of brake pads come into contact with a respective brake drum or brake disk. This pressure is a braking force acting on the wheel connected to the drum or brake and may be monitored. In some instances, a brake booster may be provided to increase the braking force.

Different brake pressures, forces, torques may be applied to the individual wheels of the vehicle or even to wheels of the front axle and the rear axle, in order to achieve an optimal braking effect where there may be different loads on the front and rear axles. Different brake torques may be fixedly specified by correspondingly different configurations of the braking mechanisms of the front and rear axles and may also be influenced by correspondingly different settings of the brake pressures that are applied to the braking mechanisms of the front and rear axles.

A constant goal in brake system improvement has been to achieve high braking deceleration. Known braking control systems determine signals from an axle load signal that correspond to a static component and a dynamic component of the axle load. From the axle load signal and a signal produced by the brake pedal, a first brake pressure control signal is generated. A second brake pressure control signal may be superimposed depending on the axle load, to control the brake pressure.

Known braking control systems also distribute brake load from one wheel brake to another wheel brake in the event a monitoring signal of one wheel brake indicates a high temperature or wear of the brake lining of one particular brake. It is also known to reduce brake pressure at the rear axle during a braking event when a braking process is compared to a static load in order to set the same adhesion utilization on the front axle and the rear axle.

Vehicle brake systems are being improved to achieve high braking deceleration as a significant safety factor in collision avoidance. However, a high braking deceleration produces a pitching motion of the motor vehicle, producing a physical load for occupants of the vehicle, especially relevant to neck muscles, which may be highly stressed in order to keep the head up while compensating for the pitching motion. A headrest on the vehicle seat may alleviate some pitch angle for the driver.

Pitching motion of the vehicle may be particularly problematic in vehicles equipped with an autonomous brake system. In an autonomous brake system the braking event is automatically initiated by an emergency braking system. Because the driver may not be expecting the braking event, the driver may not be prepared for the pitching motion and may not have time to tension their neck muscles in anticipation of the pitching motion. Furthermore, the uncomfortable effect of pitching motion of a motor vehicle may cause the driver to select a lower braking deceleration than appropriate for a particular traffic situation possibly compromising safety.

A system and method of operating a brake system of a motor vehicle is needed to alleviate pitching motion of the motor vehicle caused by the braking process.

SUMMARY

A brake system for a motor vehicle having a front axle and a rear axle and front and rear axle braking mechanisms that act on the wheel at the front and rear axles. The brake system also has a fluidic system with fluid lines for subjecting the front axle braking mechanism and the rear axle braking mechanism to brake fluid under pressure to produce a braking effect controllable by pressure and pressure control devices for producing, or varying, a brake pressure acting on the front axle braking mechanism of the front axle and a brake pressure acting on the rear axle braking mechanism of the rear axle. The pressure control devices may be in the form of fluidic pumps and/or pressure reservoirs with suitably controllable valves. Such pressure control devices may be designed and disposed in a known manner as for an electronic stability program. The brake system may comprise a brake booster for producing a brake pressure in the fluidic system that may be increased or reduced by the pressure control devices.

The brake system also has an electronic control device that is designed to detect initiation of a braking process by a driver or an autonomous control system. A signal of a brake pedal sensor or a braking demand of the control system may be detected. The control device is designed to detect the speed of travel of the motor vehicle by detecting a corresponding sensor signal or a corresponding signal of a navigation system. Furthermore, the control device is arranged such that an initial brake pressure of the rear axle braking mechanism is determined, such that depending on the speed of travel, a target brake pressure is increased, compared to an initial brake pressure, by a determined increase in pressure. The pressure control device of the rear axle is controlled by the electronic control device to apply the target brake pressure to the rear axle braking mechanism. The electronic control device may be an electronic controller of the motor vehicle or part of such an electronic control device may comprise processor means and memory means for storing a dependency of the increase in pressure based on the speed of travel and instructions to implement control of the brake system.

By fitting a motor vehicle with such a brake system, a pitching motion of the motor vehicle caused by a braking process may be reduced. This enables an increase in the ride comfort and safety of the operation of the motor vehicle.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
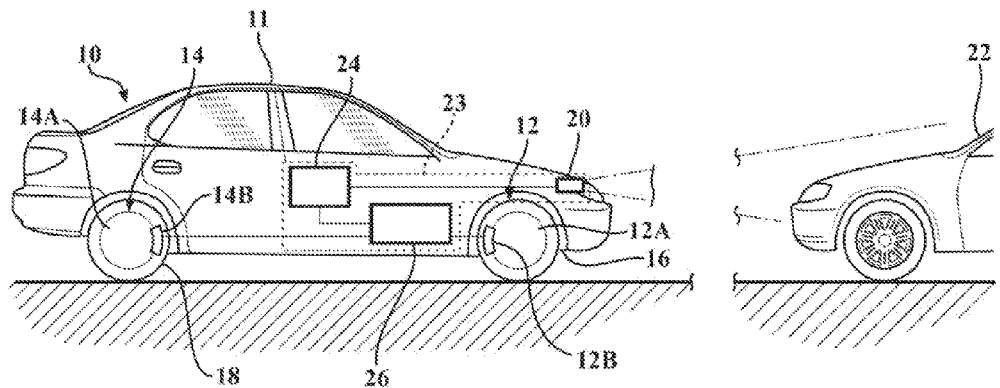
FIG. 1 illustrates a vehicle having a braking system of one or more embodiments of the inventive subject matter.

FIG. 1 shows a brake control system 10 of one or more embodiments of the inventive subject matter on a vehicle 11. The vehicle 11 has a brake system 26 having braking mechanisms 12, 14 for front and rear axles respectively. The front and rear axles may have two wheels 16, 18 at each axle respectively. The front and rear axles may also be in the form of a dual axle. The brake system 26 may be a hydraulic brake system, as shown, but may also be a pneumatic pressure transfer system. The brake system 26 may also be a dual circuit brake system, wherein one sub-circuit may act on the front axle while a second sub-circuit acts on the rear axle. Front and rear axle braking mechanisms 12, 14 shown in FIG. 1 may have disc rotors 12a, 14a rotating with wheels 16 and 18, calipers 12b, 14b, for braking the rotation of disc rotors 12a, 14a when hydraulic fluid for braking control is supplied. A controller 24 receives signals from various vehicle sensors (not shown) and has memory associated therewith and stores instructions for processing sensor signals and actuating, control of the brake system 26. Further, vehicle 11 may be equipped with a forward detection apparatus 20 for detecting the distance and relative speed between the vehicle 11 and an object 22 in its path. Vehicle 11 may also be equipped with an autonomous emergency braking apparatus 23 that receives signals from the forward detection apparatus 20.

Figure 2:
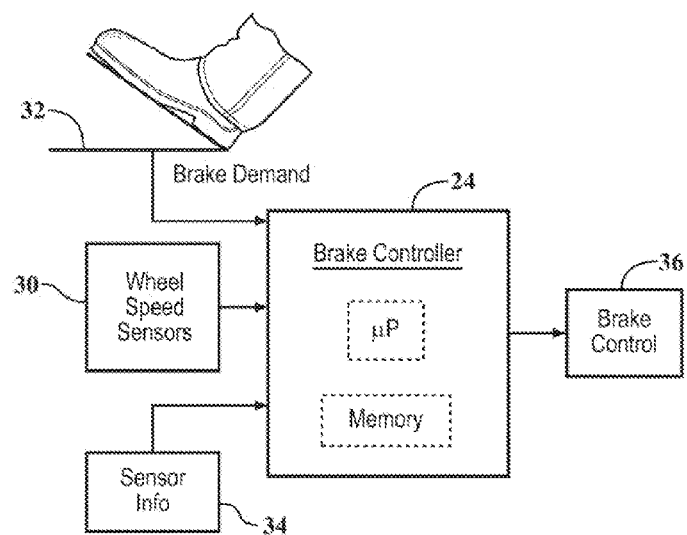
FIG. 2 is a block diagram of a brake system of one or more embodiments of the inventive subject matter.

FIG. 2 shows a block diagram of the brake control system 10 on the vehicle that may employ one or more embodiments of the inventive subject matter. A plurality of wheel speed sensors 30 are used by the brake controller 24, along with other signals such as brake demand from a brake pedal 32 and other sensors 34, for example, a signal from other sensors 34 including but not limited to a brake pedal sensor, a brake pressure sensor, a yaw rate sensor, a lateral accelerometer, a navigation system, one or more load sensors, a temperature sensor, and others, not specifically shown in FIG. 2. The brake controller 24 stores instructions to carry out the method described below and generates a brake control signal 36.

Figure 3:
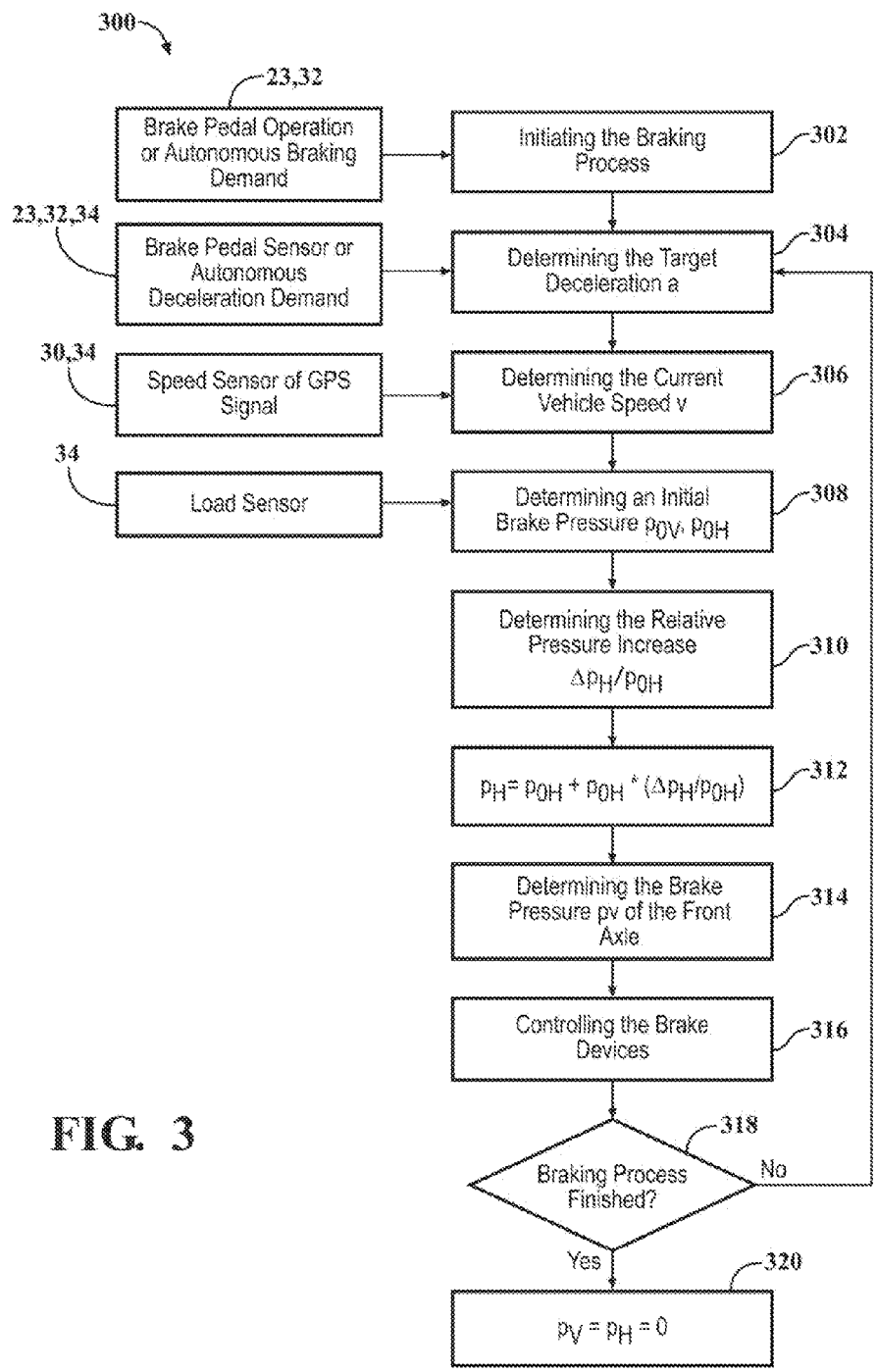
FIG. 3 is a flow chart of a method for providing braking assistance according to one or more embodiments of the inventive subject matter.

FIG. 3 shows a flow diagram of a method 300 according to one or more embodiments of the inventive subject matter. The brake controller 24 receives a signal indicating that a braking process has been initiated 302. The braking process may be initiated, for example, by operation of the brake pedal 32 by a driver of the motor vehicle. The brake pedal operation may be detected, by a suitable sensor. A minimum, deflection setting may be predetermined such that for a deflection of the brake pedal 32 less than the minimum deflection, no braking process will be initiated. The braking process may also be initiated by sensing a braking demand from the autonomous braking apparatus 23. For example, if the autonomous braking system initiates a braking event to avoid or alleviate an impending collision with an obstruction detected by the forward detection apparatus 20, the brake controller 24 will detect initiating of the braking process 302 by way of a signal from the autonomous braking apparatus 23.

A target deceleration, a, for the vehicle 11 during the braking process is determined 304. The target deceleration, a, is determined from a braking demand parameter. The braking demand parameter may be based on brake pedal travel, a force exerted on the brake pedal by a driver, the brake pedal position as detected by a brake pedal sensor, or a pressure generated in the master brake cylinder. The braking demand parameter may also be based on a signal representative of a magnitude of the braking deceleration demanded by the autonomous braking apparatus 23. The braking demand parameter may be repeatedly, or continuously, recorded during the braking process.

A current speed of travel, v, for the motor vehicle 11 is determined 306. The current speed of travel may be determined 306 from a speed signal as detected by one of the speed sensors 30 on the vehicle wheels. Alternatively, the current speed of travel may be determined from another source, such as the navigation system 34. The current speed of travel of the motor vehicle may be repeatedly, or continuously, recorded, during the braking process.

An initial brake pressure, $p_{0V}$, to which the front axle braking mechanism 12 is subjected and an initial brake pressure, $p_{0H}$, to which the rear axle braking mechanism 14 is subjected, are determined 308. The initial brake pressures, $p_{0V}$, $p_{0H}$, are dependent upon the target deceleration, a, and are determined such that the motor vehicle achieves the target deceleration, a. A characteristic field, or table, may be stored in a memory of the controller 24 and is referenced. The initial value of brake pressure. Furthermore, a brake pressure distribution between the front and rear axle braking mechanisms may be determined by taking into account signals of other sensors 34, which may detect load distribution on the front and rear axles, the temperature of the braking mechanisms, the wear on the braking mechanisms, and other influencing variables. A load sensor is shown in FIG. 1 by way of example only.

An increase in pressure, $\Delta p_H$ is determined 310 depending on the current speed, v, and the target deceleration, a, in order to increase the target brake pressure $p_H$, acting on the braking mechanism of the rear axle. The increase in pressure, $\Delta p_H$, is dependent on the speed, v, such that the increase in pressure, $\Delta p_H$, increases with reduced speed, v, and may additionally be dependent upon the target deceleration, a. The increase of the brake pressure of the rear axle braking mechanism is dependent upon the braking demand parameter and, hence, on the magnitude of the braking demand by the driver or the autonomous system. The increase of the brake pressure of the rear axle braking mechanism is determined such that the increase in pressure is greater at a lower speed. This enables the fact that the pitching motion is perceived as more unpleasant at lower speeds of the motor vehicle. Furthermore, the driving safety of the motor vehicle may be increased by producing a smaller increase in pressure at higher speed compare to the previously determined initial brake pressure. The increase in pressure of the rear axle braking mechanism is repeatedly or continuously determined.

A relative pressure increase is described by $\Delta p_H/p_{OH}$. An example of possible relative pressure increases $\Delta p_H/\Delta p_{OH}$, related to the initial brake pressure $p_{OH}$ of the rear axle braking mechanism is:

| Speed of Travel v [km/h] | Relative Increase of the Brake Pressure, $\Delta p_{OH}$ of the Rear Axle Braking Mechanism |
|---|---|
| <5 | 0.25 |
| 5 . . . 15 | 0.20 |
| 15 . . . 25 | 0.15 |
| 25 . . . 30 | 0.10 |
| >30 | 0.05 |

At low speeds, i.e., below 5 km/h, the brake pressure $\Delta p_H$ of the rear axle braking mechanism is increased compared to the initial brake pressure $p_{OH}$ by 25%. At speeds above 30 km/h an increase of a maximum of only occurs. In order to account for the target deceleration, a, the value for the relative brake pressure increase $\Delta p_H/\Delta p_{OH}$, given in the table may additionally be multiplied by a factor, f, that is proportional to the target deceleration, a, with:

$$f=1.3*a/g,$$

where g is the acceleration due to gravity (9.81 m/s). A target brake pressure, $p_H$, to which the rear axle braking mechanism is subjected, is then determined 312 from the initial brake pressure, $p_{OH}$, and the relative brake pressure increase $\Delta p_H/\Delta p_{OH}$, calculated as:

$$p_H=p_{OH}+p_{OH}(\Delta p_H/\Delta p_{OH})$$

The increase in pressure of the rear axle braking mechanism is repeatedly, or continuously, determined. The increase of the brake pressure acting on the rear axle braking mechanism is determined such that the relative increase in pressure in relation to the initial brake pressure is proportional to the target deceleration, a.

No increase of the brake pressure acting on the rear axle braking mechanism takes place if the current speed of the motor vehicle exceeds a predetermined maximum speed or the demanded braking deceleration exceeds a predetermined maximum deceleration. This enables a suitable intervention in the brake system to reduce pitching motion of the motor vehicle to be restricted, in a simple way, to driving situations in which the brake pressure increase of the rear axle braking mechanism does not result in a critical loss of adhesion with the road of one or more wheels of the rear axle.

No increase of the brake pressure of the rear axle braking mechanism occurs if an intervention of an anti-lock brake system, a driving dynamics controller, or an electronic stability program is carried out. This ensures that driving safety is not adversely affected by the increase of the brake pressure of the rear axle in critical situations.

A target brake pressure, $p_V$, acting on the front axle braking mechanism is determined 314 such that the achieved braking deceleration corresponds, as closely as possible, to the target deceleration, a. To accomplish this the brake pressure of the front axle may be reduced. A predetermined characteristic may be used. The brake pressure acting on the front axle braking mechanism may be reduced such that that the achieved braking deceleration of the motor vehicle corresponds to the tar et deceleration. This enables the deceleration of the motor vehicle that is increased by increasing the brake pressure acting on the rear axle brake mechanism to be compensated, so that the achieved deceleration of the motor vehicle depends in the usual way, on the operation of the brake pedal or without further changes to the braking deceleration demanded by the autonomous system. For example, pressure control devices present within the framework of an anti-lock brake system or an electronic stability program may be used to reduce the brake pressure acting on the front axle braking mechanism.

The braking mechanisms 12, 14 are controlled 316, by way of the target pressures, $p_H$, $p_V$. The brake pressure distribution on the front and rear axles of the vehicle that is changed relative to the initial brake pressures, $p_{OV}$, $p_{OH}$, reduces pitching motion of the motor vehicle. The front and rear axle braking mechanisms are repeatedly, or continuously, controlled using the repeatedly, or continuously, determined target brake pressures. This enables an increase of the brake pressure of the braking mechanisms to be constantly carried out during the braking process during which the speed is changing. The increase in brake pressure is being adapted to the respective current speed of travel, v. The method 300 is repeated as determined by a response time of the brake system or even by a processing speed of the controller 24. Upon determining the braking process is completed 318, the brake pressure increase, $\Delta p_H$, of the rear axle braking mechanism 14 is set to zero 320 so that the front and rear axle braking mechanisms are respectively subjected to the initial brake pressure, $p_{OV}$, $p_{OH}$. An indication that the braking process is completed may be the brake pedal operation finishing or a corresponding signal from the autonomous system.

Depending on the current speed of travel of the motor vehicle 11, the target brake pressure of the rear axle braking mechanism is increased relative to the initial brake pressure by an increase in pressure that is dependent upon the speed of the travel. The rear axle is subjected to the target brake pressure by means of the pressure fluid of the brake system. A pressure control device, i.e., controller 24, is associated with the rear axle braking mechanism 14 for setting, the target brake pressure. Such pressure control devices acting on individual, wheels are typically present in motor vehicles, especially on vehicles that have an electronic stability system. These systems may be used within the scope of one or more embodiments of the inventive subject matter to increase brake pressure at the rear axle braking mechanism, for example, by synchronous control of the pressure control devices associated with the two rear wheels of the motor vehicle.

By controlling the rear axle braking mechanism with a target brake pressure that is increased compared to an initial brake pressure by a speed-dependent amount, a correspondingly increased braking effect of the rear axle braking mechanism is achieved. The pitching motion of the motor vehicle caused by the braking process may be reduced by such a speed-dependent brake pressure increase of the rear axle braking mechanism. This enables a reduction in the physical effort that the occupants of the vehicle must exert to maintain their head positions. Operation and control of the motor vehicle are also facilitated, especially if the braking process has been initiated by the autonomous braking apparatus.

In the foregoing specification, the invention has been described with reference to specific exemplary embodiments. Various modifications and changes may be made, however, without departing from the scope of the inventive subject matter as set forth in the claims. Additionally, the components and/or elements recited in any apparatus claims may be assembled or otherwise operationally configured in a variety of permutations and are accordingly not limited to the specific configuration recited in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for operating a brake system of a motor vehicle having front and rear axles with respective front and rear axle braking mechanisms, the method carried out in a controller of the brake system, the controller having memory with stored instructions to carry out the steps of:
   receiving a signal indicative of initiation of a braking process;
   receiving a signal indicative of a current speed of travel;
   determining an initial brake pressure for the rear axle braking mechanism;
   determining a target brake pressure for the rear axle braking mechanism that is representative of an increase in pressure relative to the initial brake pressure and an increase in pressure that increases in response to a reducing current speed of travel; and
   subjecting the rear axle braking mechanism to the target brake pressure.

2. The method as claimed in claim 1 wherein the step of receiving the signal indicative of the current speed of travel occurs repeatedly and the target brake pressure is repeatedly determined.

3. The method as claimed in claim 1 wherein the step of receiving the signal indicative of the current speed of travel occurs continuously and the target brake pressure is continuously determined.

4. The method as claimed in claim 1 wherein the step of receiving the signal indicative of the current speed of travel occurs repeatedly and the target brake pressure is repeatedly determined.

5. The method as claimed in claim 1 wherein the step of receiving the signal indicative of the current speed of travel occurs continuously and the target brake pressure is continuously determined.

6. The method as claimed in claim 1 wherein the method further comprises the step of detecting a braking demand parameter and the increase in pressure is dependent upon the braking demand parameter.

7. The method as claimed in claim 6 further comprising the steps of:
   determining a target deceleration using the braking demand parameter; and
   the increase in pressure relative to the initial brake pressure of the rear axle braking mechanism is proportional to the target deceleration.

8. The method as claimed in claim 6 further comprising the steps of:
   determining a target brake pressure for the front axle braking mechanism; and
   subjecting the front axle braking mechanism to the target brake pressure for the front axle braking mechanism thereby reducing an initial brake pressure at the front axle to achieve the target deceleration.

9. The method as claimed in claim 6 wherein the step of detecting the braking demand parameter occurs repeatedly and the increase in pressure is repeatedly determined.

10. The method as claimed in claim 6 wherein the step of detecting the braking demand parameter occurs continuously and the increase in pressure is continuously determined.

11. The method as claimed in claim 6 wherein if the current speed of travel is greater than a predetermined maximum speed or a target deceleration exceeds a predetermined maximum deceleration, the increase in pressure for the target brake pressure for the rear axle braking mechanism is set to zero rate of increase and the rear axle braking mechanism is subject to the initial brake pressure.

12. The method as claimed in claim 1 wherein if the current speed of travel is greater than a predetermined maximum speed, the increase in pressure for the rear axle braking mechanism is set to zero rate of increase and the rear axle braking mechanism is subject to the initial brake pressure.

13. The method as claimed in claim 1 wherein if an intervention of the brake system by another system on the vehicle is taking place, the step of subjecting the rear axle braking mechanism to the target brake pressure does not take place.

14. A brake system for a motor vehicle having front and rear axles, the brake system comprising:
   front and rear axle braking mechanisms operated under pressure control devices for producing a respective brake pressure on the front and rear axles of the motor vehicle;
   a controller to receive signal information from sensors and systems on the motor vehicle, to detect initiation of a braking process, and to detect a current speed of travel of the motor vehicle;
   a signal received at the controller indicative of initiation of the braking process;
   a signal received at the controller indicative of the current speed of travel;
   an initial brake pressure for the rear axle braking mechanism as determined by the controller;
   a target brake pressure for the rear axle braking mechanism that is determined by the controller to be representative of an increase in pressure relative to the initial brake pressure that increases in response to a reduction in the current speed of travel; and instructions from a memory of the controller to operate the pressure control devices to produce the target brake pressure at the rear axle braking mechanism.

15. The system as claimed in claim 14 further comprising a signal received at the controller indicative of a braking demand parameter and the controller using the braking demand parameter to determine the increase in pressure.

16. The system as claimed in claim 15 further comprising a target deceleration determined by the controller using the braking demand parameter, the increase in pressure relative to the initial brake pressure of the rear axle braking mechanism is proportional to the target deceleration.

17. The system as claimed in claim 16 further comprising a target brake pressure for the front axle braking mechanism that is determined by the controller in order to achieve the target deceleration.

18. The system as claimed in claim 16 wherein if the current speed of travel exceeds a predetermined maximum speed or the target deceleration exceeds a predetermined maximum deceleration, then the increase in pressure is set to zero rate of increase and the rear axle braking mechanism is subjected to the initial brake pressure.

19. The system as claimed in claim 16 wherein if an intervention of another vehicle system is taking place in the braking system then the target brake pressure is not produced at the rear axle braking mechanism.

20. The system as claimed in claim 15 wherein the braking demand parameter is continuously updated in the controller and the target brake pressure is continuously updated.

21. The system as claimed in claim 14 wherein the current speed of travel is continuously updated in the controller and the target brake pressure is continuously updated.

22. The system as claimed in claim 14 wherein if the current speed of travel exceeds a predetermined maximum speed then the controller sets the increase in pressure to zero rate of increase and the rear axle braking mechanism is subjected to the initial brake pressure.

23. The system as claimed in claim 14 wherein if an intervention of another vehicle system is taking place in the braking system then the target brake pressure is not produced at the rear axle braking mechanism.

\* \* \* \* \*